United States Patent
Lee et al.

(10) Patent No.: US 8,786,792 B2
(45) Date of Patent: Jul. 22, 2014

(54) MOTHER SUBSTRATE FOR LIQUID CRYSTAL DISPLAY DEVICE AND METHOD OF FABRICATING THE SAME

(75) Inventors: Jeong-yeop Lee, Daegu (KR); Jae-myung Seok, Daegu (KR); Jae-woo Jung, Busan (KR); Young-seok Choi, Goyang-si (KR); Hyock-jae Shin, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 1258 days.

(21) Appl. No.: 12/654,069

(22) Filed: Dec. 9, 2009

(65) Prior Publication Data
US 2010/0165226 A1 Jul. 1, 2010

(30) Foreign Application Priority Data
Dec. 26, 2008 (KR) .................. 10-2008-0134710

(51) Int. Cl.
G02F 1/1333 (2006.01)
G02F 1/1345 (2006.01)
G02F 1/1362 (2006.01)

(52) U.S. Cl.
USPC ............... 349/40; 438/720; 216/13; 216/18; 216/23; 216/67

(58) Field of Classification Search
CPC .......... G02F 1/136204; G02F 1/13452; G02F 1/13454; G02F 2001/133388
USPC .............. 349/40; 216/23, 13, 18, 67; 438/720
See application file for complete search history.

(56) References Cited

U.S. PATENT DOCUMENTS

| 5,824,235 A | * | 10/1998 | Yamazaki et al. | 216/23 |
| 7,139,044 B2 | * | 11/2006 | Lee et al. | 349/40 |
| 2002/0126231 A1 | * | 9/2002 | Zhang et al. | 349/40 |
| 2008/0224601 A1 | | 9/2008 | Frischknecht | |

FOREIGN PATENT DOCUMENTS

CN 101097304 A 1/2008

* cited by examiner

*Primary Examiner* — Huyen Ngo
(74) *Attorney, Agent, or Firm* — McKenna Long & Aldridge LLP (57) ABSTRACT

A mother substrate for a liquid crystal display device includes: a substrate; a plurality of unit array patterns on the substrate, each of the plurality of unit array patterns including a gate line, a data line crossing the gate line, a thin film transistor connected to the gate line and the data line and a pixel electrode connected to the thin film transistor; a first electrostatic discharge pattern surrounding the plurality of unit array patterns; a second electrostatic discharge pattern connected to the gate line and crossing the first electrostatic discharge pattern; and a third electrostatic discharge pattern connected to the data line and crossing the first electrostatic discharge pattern, the third electrostatic discharge pattern contacting the second electrostatic discharge pattern.

14 Claims, 7 Drawing Sheets

MOTHER SUBSTRATE FOR LIQUID CRYSTAL DISPLAY DEVICE AND METHOD OF FABRICATING THE SAME

This application claims the benefit of Korean Patent Application No. 10-2008-0134710, filed in Korea on Dec. 26, 2008, which is hereby incorporated by reference in its entirety.

BACKGROUND OF THE INVENTION

1. Field of the Invention

The present application relates to a mother substrate for a liquid crystal display device and a method of fabricating the mother substrate, and more particularly, to a mother substrate including an electrostatic discharge pattern and a method of fabricating a liquid crystal display device using the mother substrate.

2. Discussion of the Related Art

In general, liquid crystal display (LCD) devices use the optical anisotropy and polarization properties of liquid crystal molecules of a liquid crystal layer to produce an image. The liquid crystal molecules have long and thin shapes. Because of the optical anisotropy property, the polarization of light varies with the alignment direction of the liquid crystal molecules. The alignment direction of the liquid crystal molecules can be controlled by varying the intensity of an electric field applied to the liquid crystal layer. Accordingly, a typical LCD device includes two substrates spaced apart and facing each other and a liquid crystal layer interposed between the two substrates. Each of the two substrates includes an electrode on a surface facing the other of the two substrates. A voltage is applied to each electrode to induce an electric field between the electrodes. The arrangement of the liquid crystal molecules as well as the transmittance of light through the liquid crystal layer is controlled by varying the intensity of the electric field. LCD devices are non-emissive type display devices that employ a light source to display images using the change in light transmittance.

Among the various types of LCD devices, active matrix LCD (AM-LCD) devices that employ switching elements and pixel electrodes arranged in a matrix structure are the subject of significant research and development because of their high resolution and superior suitability for displaying moving images.

Figure 1:
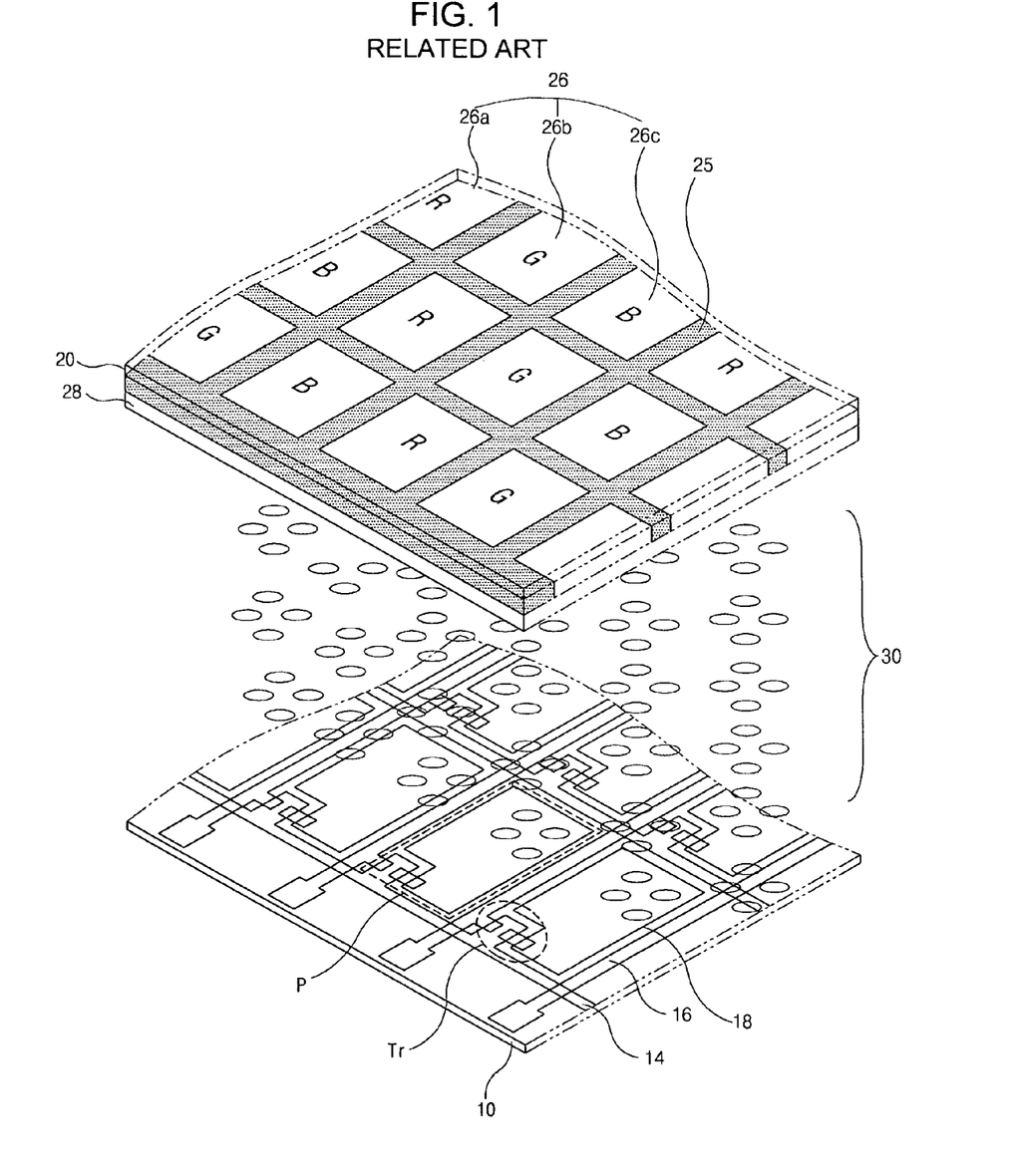
FIG. 1 is a perspective view of a liquid crystal display device according to the related art.

FIG. 1 is a perspective view of a liquid crystal display device according to the related art. As shown in FIG. 1, the liquid crystal display (LCD) device of the related art includes a first substrate 10, a second substrate 20 and a liquid crystal layer 30. The first substrate 10, which is referred to as an array substrate, includes a gate line 14 and a data line 16 crossing each other to define a pixel region P. A pixel electrode 18 and a thin film transistor (TFT) Tr, as a switching element, are positioned in each pixel region P. The TFT Tr, which is disposed adjacent to crossings of the gate lines 14 and the data lines 16, is disposed in a matrix on the first substrate 10. The second substrate 20, which is referred to as a color filter substrate, includes color filter layer 26 including red (R), green (G) and blue (B) color filters 26a, 26b and 26c, a black matrix 25 between the red, green and blue color filters 26a, 26b and 26c and a common electrode 28 on both the color filter layer 26 and the black matrix 25.

Although not shown in FIG. 1, the first and second substrates 10 and 20 are attached with a seal pattern to prevent leakage of liquid crystal layer 30. In addition, a first alignment layer is formed between the first substrate 10 and the liquid crystal layer 30 and a second alignment layer is formed between the second substrate 20 and the liquid crystal layer 30 to align the liquid crystal molecules in the liquid crystal layer 30 along an initial alignment direction. A polarization plate is formed on an outer surface of at least one of the first and second substrates 10 and 20.

Further, a backlight unit (not shown) disposed under the first substrate 10 supplies light. A gate signal turning the TFT Tr on is sequentially applied to each of the gate lines 14, and an image signal on the data line 16 is applied to the pixel electrode 18 in the pixel region P. The liquid crystal molecules in the liquid crystal layer 30 are driven by a vertical electric field generated between the pixel electrode 18 and the common electrode 28 to display images by varying the light transmittance of the liquid crystal molecules.

The LCD device is completed through an array substrate process, a color filter substrate process and a cell process. The pixel electrode 11 and the TFT Tr are formed on each pixel region P of the first substrate 10 in the array substrate process, and the color filter layer 26, the black matrix 25 and the common electrode 28 are formed on the second substrate 20 in the color filter substrate process. Further, the first and second substrates 10 and 20 are attached and liquid crystal molecules are injected between the first and second substrates 10 and 20 in the cell process.

To improve productivity, a plurality of array substrates are obtained by forming a plurality of unit array patterns on a single mother substrate and cutting the single mother substrate. Similarly, a plurality of color filter substrates are obtained by forming a plurality of unit color filter patterns on a single mother substrate and cutting the single mother substrate. As a result, a plurality of LCD devices are obtained from two mother substrates by attaching the plurality of array substrates and the plurality of color filter substrates.

Figure 2:
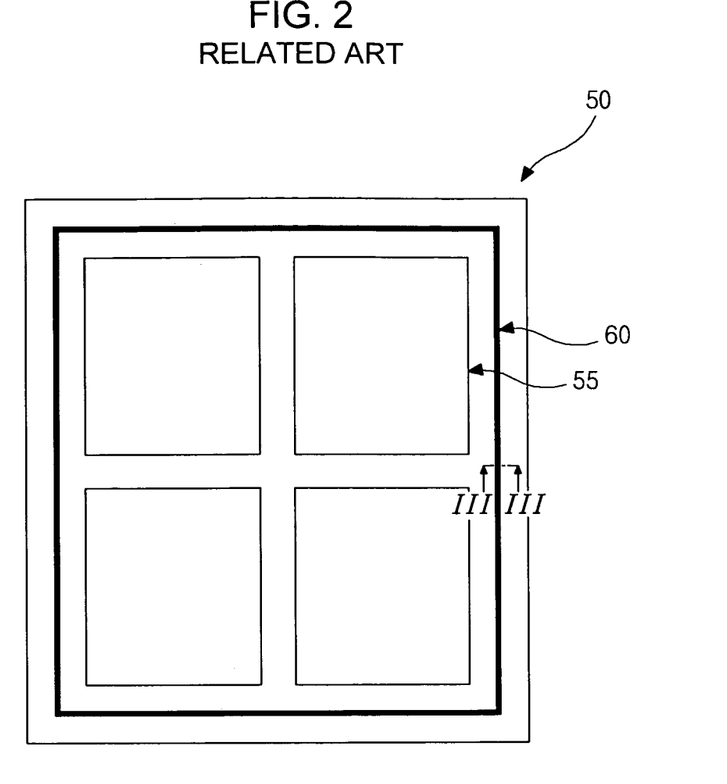
FIG. 2 is a plane view showing a mother substrate according to the related art.
Figure 3:
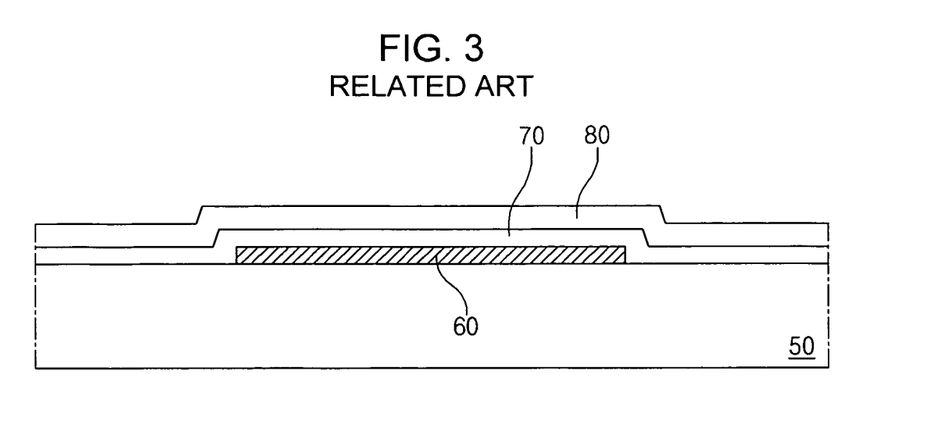
FIG. 3 is a cross-sectional view taken along a line of FIG. 2.

FIG. 2 is a plane view showing a mother substrate according to the related art, and FIG. 3 is a cross-sectional view taken along a line of FIG. 2.

In FIG. 2, a plurality of unit array patterns 55 are formed on a mother substrate 50. Although not shown in FIG. 2, a gate line, a data line, a thin film transistor (TFT) and a pixel electrode are formed in an inner portion of each unit array pattern 55. The gate line and the data line cross each other to define a pixel region and the TFT as a switching element is connected to the gate line and the data line. The pixel electrode is connected to the TFT.

In addition, a metal pattern 60 having a closed rectangular loop shape and surrounding the plurality of unit array patterns 55 is formed in an edge portion of the mother substrate 50. The metal pattern 60 has the same layer and the same material as the gate line such that the metal pattern 60 is formed directly on the mother substrate 50. Subsequently, a plurality of layers such as a gate insulating layer 70, a semiconductor layer (not shown) and a passivation layer 80 are formed on the metal pattern 60 in a vacuum apparatus (not shown).

The metal pattern 60 is used for preventing static electricity generated at an outer portion thereof. When static electricity having a relatively high voltage is generated at the mother substrate 50, the static electricity is transmitted along a conductive line and is discharged at an electrically weak portion. For example, the static electricity may be discharged as a spark at the electrically weak portion and the electrically weak portion may be broken. In the absence of the metal pattern 60, the static electricity may be concentrated on elements of each unit array pattern 55, for example, the TFT, and the elements may be broken. However, since the static electricity generated at the outer portion of the metal pattern 60 is transmitted along the metal pattern 60 and does not penetrate into the inner portion of the metal pattern 60, the elements of each unit array pattern 55 are protected from the static electricity. As a result, while the plurality of layers are deposited in the vacuum apparatus, the metal pattern 60 prevents static electricity generated in a corner portion of the mother substrate 50 from penetrating into the plurality of unit array patterns 55.

However, the metal pattern 60 does not remove static electricity generated at the inner portion of the metal pattern 60. During a process of the mother substrate 50 in the vacuum apparatus, although most of the static electricity is generated at the corner portion of the mother substrate 50, some of the static electricity is generated at a central portion of the mother substrate 50. In addition, when the mother substrate 50 is loaded on and unloaded from a stage of an apparatus, e.g., a measurement apparatus, an inspection apparatus or an exposure apparatus, different from the vacuum apparatus, the static electricity is generated at a random portion of the mother substrate 50. As a result, the plurality of unit array patterns 55 may be deteriorated by the static electricity generated at the inner portion of the metal pattern 60 even when the metal pattern 60 is formed on the mother substrate 50.

The mother substrate 50 is cut into a plurality of array substrates each including the unit array patterns 55. Similarly, the other mother substrate (not shown) is cut into a plurality of color filter substrates. Each array substrate and each color filter substrate are attached to form an LCD device, and inspection is performed for the LCD device. When the LCD device is judged to be deteriorated, the LCD device is renounced. As a result, a good color filter substrate attached to a bad array substrate is renounced, and production cost increases.

To reduce the production cost, inspection may be performed before the mother substrate is cut. After the mother substrate is cut, the array substrate judged to be deteriorated is renounced, and the array substrate judged to be not deteriorated and the color filter substrate are attached to form an LCD device. Accordingly, production cost may be partially reduced. However, since the number of steps for injecting liquid crystal materials and attaching the array substrate and the color filter substrate increase, productivity is reduced and fabrication time increases.

SUMMARY OF THE INVENTION

Accordingly, embodiments of the invention are directed to a mother substrate for a liquid crystal display device and a method of fabricating the mother substrate that substantially obviates one or more of problems due to limitations and disadvantages of the related art.

An advantage of the invention is to provide a mother substrate wherein a static electricity generated at every portion of the mother substrate is discharged and a method of fabricating the mother substrate.

Another advantage of the invention is to provide a mother substrate having an electrostatic discharge pattern that prevents static electricity from deteriorating a plurality of unit array patterns and a method of fabricating the mother substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, according to an aspect of the invention, a mother substrate for a liquid crystal display device includes: a substrate; a plurality of unit array patterns on the substrate, each of the plurality of unit array patterns including a gate line, a data line crossing the gate line, a thin film transistor connected to the gate line and the data line and a pixel electrode connected to the thin film transistor; a first electrostatic discharge pattern surrounding the plurality of unit array patterns; a second electrostatic discharge pattern connected to the gate line and crossing the first electrostatic discharge pattern; and a third electrostatic discharge pattern connected to the data line and crossing the first electrostatic discharge pattern, the third electrostatic discharge pattern contacting the second electrostatic discharge pattern.

In another aspect, a method of fabricating a mother substrate for a liquid crystal display device includes: forming a plurality of unit array patterns on a substrate, each of the plurality of unit array patterns including a gate line, a data line crossing the gate line, a thin film transistor connected to the gate line and the data line and a pixel electrode connected to the thin film transistor; forming a first electrostatic discharge pattern surrounding the plurality of unit array patterns; forming a second electrostatic discharge pattern connected to the gate line and crossing the first electrostatic discharge pattern; and forming a third electrostatic discharge pattern connected to the data line and crossing the first electrostatic discharge pattern, the third electrostatic discharge pattern contacting the second electrostatic discharge pattern.

In another aspect, a method of fabricating a liquid crystal display device includes: forming a plurality of unit array patterns on a first mother substrate, each of the plurality of unit array patterns including a gate line, a data line crossing the gate line, a thin film transistor connected to the gate line and the data line and a pixel electrode connected to the thin film transistor; forming a first electrostatic discharge pattern surrounding the plurality of unit array patterns; forming a second electrostatic discharge pattern connected to the gate line and crossing the first electrostatic discharge pattern; forming a third electrostatic discharge pattern connected to the data line and crossing the first electrostatic discharge pattern, the third electrostatic discharge pattern contacting the second electrostatic discharge pattern; forming a plurality of unit color filter patterns on a second mother substrate, each of the plurality of unit color filter patterns including a black matrix, a color filter layer on the black matrix, a common electrode on the color filter layer; attaching the first and second mother substrates such that the pixel electrode faces the common electrode; cutting the first and second mother substrates along a substrate cutting line such that the first, second and third electrostatic discharge patterns are removed; and forming a liquid crystal layer between the pixel electrode and the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 4:
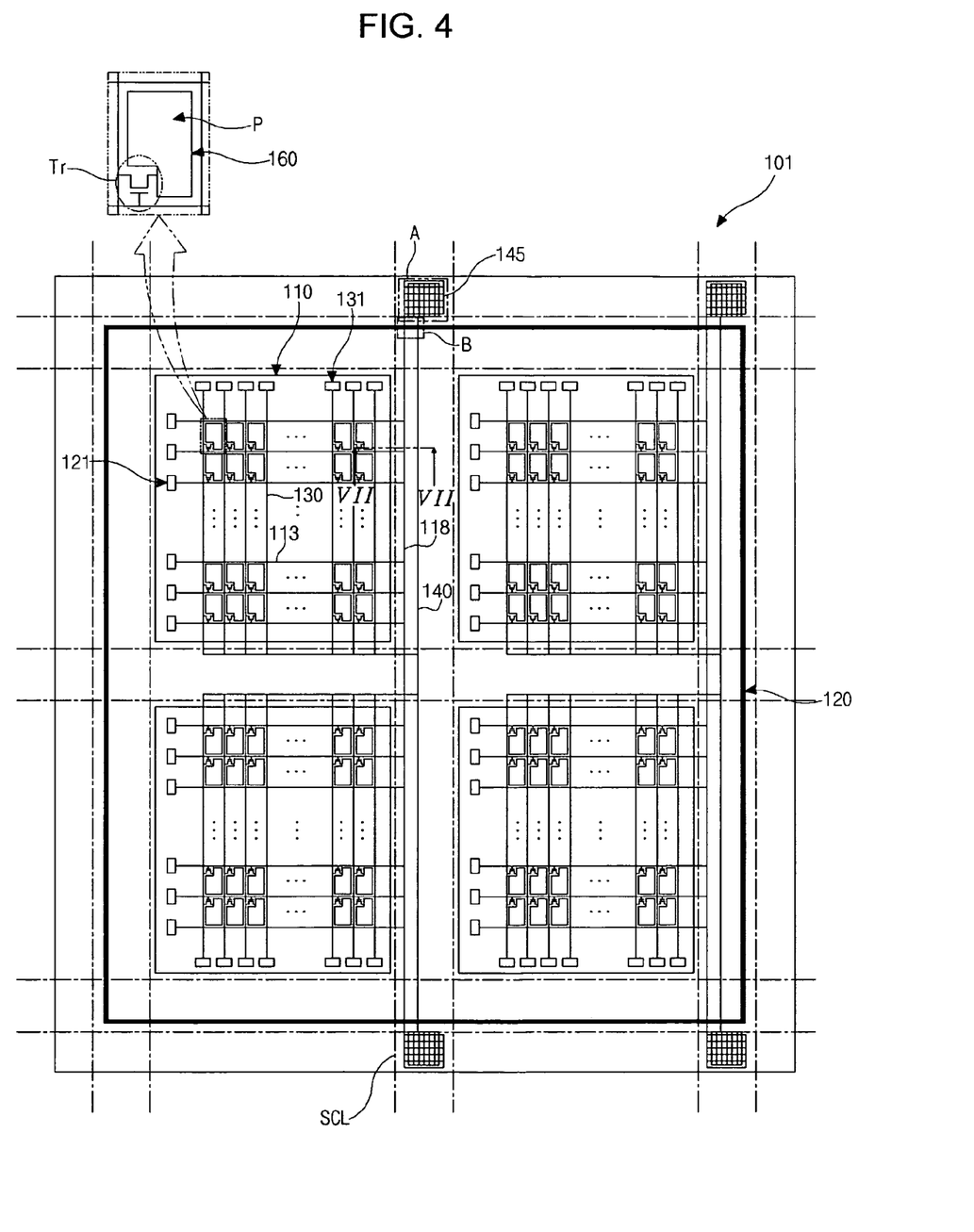
FIG. 4 is a plane view showing a mother substrate for a liquid crystal display device according to an embodiment of the present invention.

FIG. 4 is a plane view showing a mother substrate for a liquid crystal display device according to an embodiment of the present invention. In addition, FIGS. 5 and 6 are magnified plane views showing portions A and B of FIG. 4, respectively.

Figure 5:
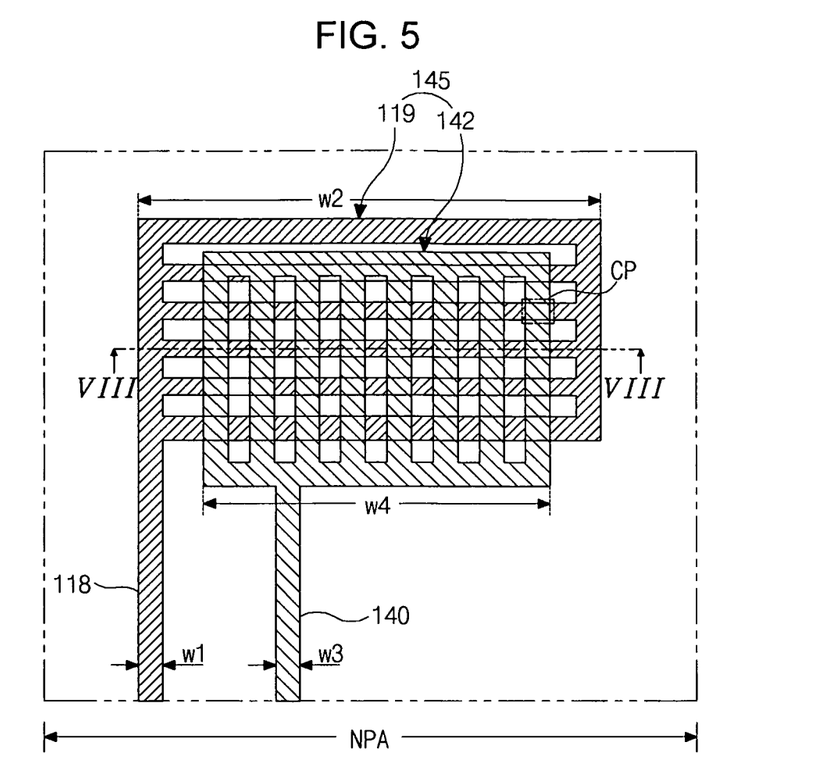
FIGS. 5 and 6 are magnified plane views showing portions A and B of FIG. 4, respectively.
Figure 6:
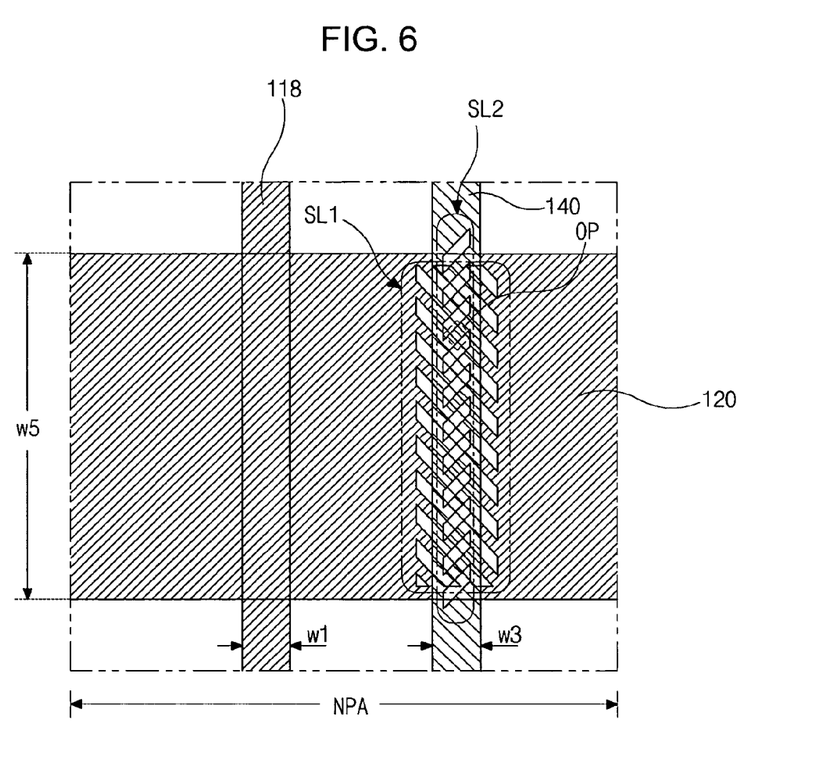

In FIGS. 4, 5 and 6, a plurality of unit array patterns 110, a first electrostatic discharge (ESD) pattern 120, a second electrostatic discharge pattern 118, a third electrostatic discharge pattern 140 and a shortage pattern 145 are formed on a mother substrate 101 for a liquid crystal display (LCD) device. The plurality of unit array patterns 110 in a central portion of the mother substrate 101 are spaced apart from each other, and the first electrostatic discharge pattern 120 having a closed loop shape in a boundary portion of the mother substrate 101 surrounds the plurality of unit array patterns 110. The second and third electrostatic discharge patterns 118 and 140 extend from each of the plurality of unit array patterns 110 to an edge portion of the mother substrate, and the shortage pattern 145 is connected to ends of the second and third electrostatic discharge patterns 118 and 140 at the edge portion of the mother substrate 101. Accordingly, the plurality of unit array patterns 110 are disposed in the central portion of the mother substrate 101, the shortage pattern 145 is disposed at the edge portion of the mother substrate 101. In addition, the first electrostatic discharge pattern 120 is disposed at the boundary portion between the central portion and the edge portion of the mother substrate 101, and the second and third electrostatic discharge patterns 118 and 140 extend from the central portion to the edge portion through the boundary portion.

The shortage pattern 145 includes a first slit pattern 119 connected to the second electrostatic discharge pattern 118 and a second slit pattern 142 connected to the third electrostatic discharge pattern 140, and the first and second slit patterns 119 and 140 contact each other without the gate insulating layer interposed therebetween. As a result, the second and third electrostatic discharge patterns 118 and 140 cross the first electrostatic discharge pattern 120 and are connected to each other through the shortage pattern 145. Although the second electrostatic discharge patterns 118 of adjacent unit array patterns 110 are connected to each other and the third electrostatic discharge patterns 140 of adjacent unit array patterns 110 are not connected to each other in FIG. 4, the second electrostatic discharge patterns of adjacent unit array patterns may not be connected to each other and the third electrostatic discharge patterns of adjacent unit array patterns may be connected to each other in another embodiment.

Each of the plurality of unit array patterns 110 includes a gate line 113, a data line 130, a thin film transistor (TFT) Tr, a pixel electrode 160, a gate pad 121 and a data pad 131. The gate line 113 and the data line 130 cross each other to define a pixel region P, and the TFT Tr is connected to the gate line 113 and the data line 130. The pixel electrode 160 is connected to the TFT Tr and is disposed in the pixel region P. One end of the gate line 113 is connected to the gate pad 121 and the other end of the gate line 113 is connected to the second electrostatic discharge pattern 118. In addition, one end of the data line 130 is connected to the data pad 131 and the other end of the data line 130 is connected to the third electrostatic discharge pattern 140.

Although not shown in FIGS. 4, 5 and 6, the TFT Tr may include a gate electrode connected to the gate line 113, a gate insulating layer on the gate electrode, an active layer on the gate insulating layer over the gate electrode, an ohmic contact layer on the active layer, a source electrode connected to the data line 130 and a drain electrode spaced apart from the source electrode. The source and drain electrodes contact the ohmic contact layer. In addition, a passivation layer may be formed on the TFT Tr and the pixel electrode may be formed on the passivation layer. Each of the plurality of unit array patterns may further include a storage capacitor. The storage capacitor may include a portion of the gate line 113 as a first capacitor electrode, a portion of the pixel electrode overlapping the first capacitor electrode as a second capacitor electrode and a portion of the gate insulating layer and the passivation layer between the first and second capacitor electrodes as a dielectric layer.

The first electrostatic discharge pattern 120, the second electrostatic discharge pattern 118 and the first slit pattern 119 of the shortage pattern 145 have the same layer and the same material as the gate line 113 and the gate electrode. Accordingly, the second electrostatic discharge pattern 118 and the first slit pattern 119 of the shortage pattern 145 are formed directly on the mother substrate 101, and the first and second electrostatic discharge patterns 120 and 118 are connected to each other. The third electrostatic discharge pattern 140 and the second slit pattern 142 of the shortage pattern 145 have the same layer and the same material as the data line 130, the source electrode and the drain electrode. Accordingly, the third electrostatic discharge pattern 140 is formed directly on the gate insulating layer. However, since the gate insulating layer is not formed on the first slit pattern 119, the second slit pattern 142 of the shortage pattern 145 is formed directly on the first slit pattern 119. For example, after the gate line 113 and the first slit pattern 119 are formed on the mother substrate 101, insulating materials may be deposited on the mother substrate 101 using a shadow mask shielding the first slit pattern 119 such that the gate insulating layer is not formed on the first slit pattern 119.

The second electrostatic discharge pattern 118 has a first width w1 and the first slit pattern 119 has a second width w2 greater than the first width w1. The third electrostatic discharge pattern 140 has a third width w3 and the second slit pattern 142 has a fourth width greater than the third width w3. In addition, the first slit pattern 119 includes horizontal openings and horizontal bar patterns parallel to the gate line 113, and the second slit pattern 142 includes vertical openings and vertical bar patterns parallel to the date line 130. The direction of the openings and the bar patterns of the first slit pattern 119 is perpendicular to the direction of the openings and the bar patterns of the second slit pattern 142.

The first and second slit patterns 119 and 142 contact and overlap each other such that the shortage pattern 145 has a lattice shape having a plurality of contact portions CP. Since the plurality of contact portions CP are formed by contact of the first and second slit patterns 119 and 142 of different two layers, the plurality of contact portions CP are electrically weaker than any other portions of each of the second and third electrostatic discharge patterns 118 and 140 of single layer. Further, the plurality of contact portions CP become electrically weaker by reduction in contact area due to the slit shape. As a result, when static electricity having a relatively high voltage is generated at the mother substrate 101, the static electricity is transmitted along the second and third electrostatic discharge patterns 118 and 140 and is discharged at the plurality of contact portions CP of the shortage pattern 145. For example, the static electricity may be discharged as a spark at the plurality of contact portions CP of the shortage pattern 145 and the plurality of contact portions CP of the shortage pattern 145 may be broken. After two mother substrates are attached, the attached two mother substrates are cut along a substrate cutting line SCL, and the shortage pattern 145 is cut away and is removed. The cutting line may be disposed to cut away and remove the first, second and third electrostatic discharge patterns 120, 118 and 140 and the shortage pattern 145. As a result, the plurality of unit array patterns 110 of the mother substrate 101 are used as an array substrate for an LCD device even when the shortage pattern 145 is broken due to the static electricity.

The first electrostatic discharge pattern 120 has a fifth width w5 greater than each of the first width w1 and the third width w3. Further, the first electrostatic discharge pattern 120 and the third electrostatic discharge pattern 140 cross each other. At a crossing portion, the first electrostatic discharge pattern 120 has a first slit part SL1 including first slant openings and first slant bar patterns and the third electrostatic discharge pattern 140 has a second slit part SL2 including second slant openings and second slant bar patterns. The slant direction of the first slant openings and the first slant bar patterns is opposite to the slant direction of the second slant openings and the second bar patterns. As a result, the first slit part SL1 of the electrostatic discharge pattern 120 and the second slit part SL2 of the third electrostatic discharge pattern 140 constitute a slant lattice shape having a plurality of overlapping portions OP.

After the gate line 113 and the first electrostatic discharge pattern 120 are formed on the mother substrate 101, the insulating materials are deposited on the gate line 113 and the first electrostatic discharge pattern 120 to form the gate insulating layer. However, since the first electrostatic discharge pattern 120 is disposed at the edge portion of the mother substrate 101, the gate insulating layer having a relatively thin thickness may be formed on the first electrostatic discharge pattern 120 or the gate insulating layer may not be formed on the first electrostatic discharge pattern 120. As a result, the plurality of overlapping portions OP are electrically weaker than any other portions of each of the first electrostatic discharge pattern 120 and the third electrostatic discharge pattern 140. Further, the plurality of overlapping portions OP become electrically weaker by reduction in overlapping area due to the slit shape.

Accordingly, when static electricity having a relatively high voltage is generated at the mother substrate 101, the static electricity is transmitted along the first electrostatic discharge pattern 120 and the third electrostatic discharge pattern 140 and is discharged at the plurality of overlapping portions OP. For example, the static electricity may be discharged as a spark at the plurality of overlapping portions OP, and the plurality of overlapping portions OP may be broken. When the thin gate insulating layer is formed between the first electrostatic discharge pattern 120 and the third electrostatic discharge pattern 140, the gate insulating layer may be broken with the plurality of overlapping portions OP. Since the attached two mother substrate is cut along the substrate cutting line SCL after two mother substrates are attached, the first electrostatic discharge pattern 120 including the plurality of overlapping portions OP is cut away and is removed. As a result, the plurality of unit array patterns 110 of the mother substrate 101 are used as an array substrate for an LCD device even when the plurality of overlapping portions OP are broken due to the static electricity.

In the mother substrate 101 according to an embodiment of the present invention, since the elements of the plurality of unit array patterns 110 such as the gate line 113, the data line 130 and the TFT Tr are electrically connected to each other through the first, second and third electrostatic discharge patterns 120, 118 and 140, the elements of the plurality of unit array patterns 110 have an equal voltage (an equipotential state). As a result, break of the elements of the plurality of unit array patterns 110 due to the voltage difference by the static electricity is prevented. In addition, since the static electricity generated at the inner portion of the first electrostatic discharge pattern 120 is transmitted to the outer portion of the first electrostatic discharge pattern 120 through the second and third electrostatic discharge patterns 118 and 140 and is discharged as a spark at the plurality of contact portions CP and the plurality of overlapping portions OP, break of the elements of the plurality of unit array patterns 110 due to the static electricity is prevented.

Figure 7:
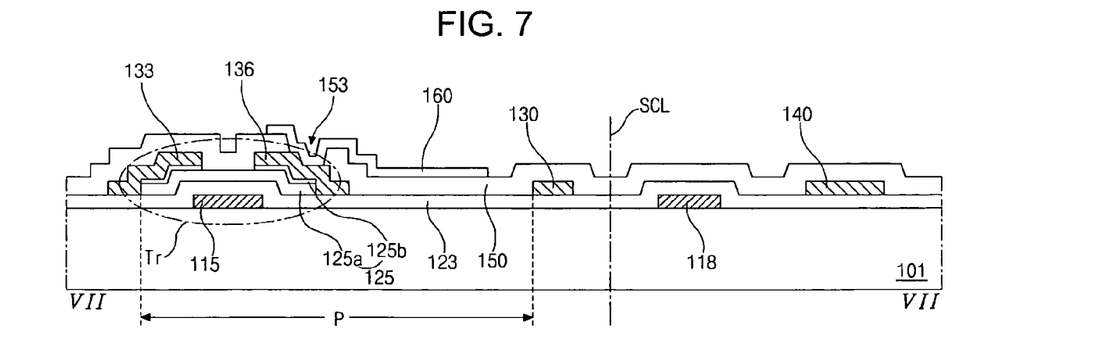
FIG. 7 is a cross-sectional view, which is taken along a line VII-VII of FIG. 4, showing a mother substrate according to an embodiment of the present invention.
Figure 8:
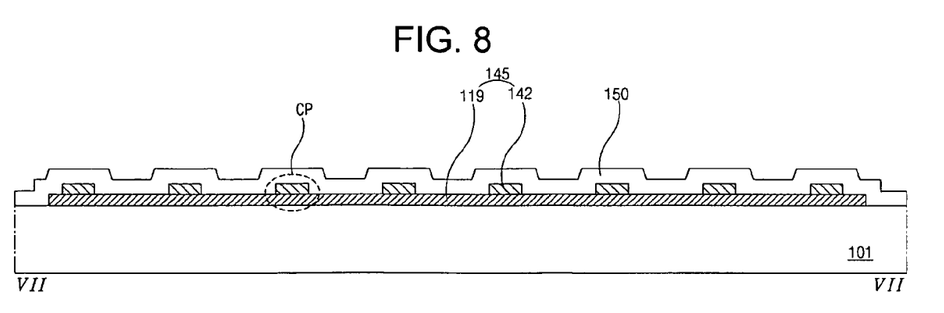
FIG. 8 is a cross-sectional view, which is taken along a line VIII-VIII of FIG. 5, showing a mother substrate according to an embodiment of the present invention.

FIG. 7 is a cross-sectional view, which is taken along a line VII-VII of FIG. 4, showing a mother substrate according to an embodiment of the present invention, and FIG. 8 is a cross-sectional view, which is taken along a line VIII-VIII of FIG. 5, showing a mother substrate according to an embodiment of the present invention.

In FIGS. 7 and 8, a gate line 113 (of FIG. 4), a gate electrode 115, a gate pad 121 (of FIG. 4), a first electrostatic discharge pattern 120, a second electrostatic discharge pattern 118 and a first slit pattern 119 are formed on a mother substrate 101. The gate electrode 115 is connected to the gate line 113 and the gate pad 121 is formed at one end of the gate line 113. The first electrostatic discharge pattern 120 at an edge portion of the mother substrate 101 has a rectangular closed loop shape surrounding a central portion of the mother substrate 101 including the gate line 113, the gate electrode 115 and the gate pad 121. The second electrostatic discharge pattern 118 is connected to the other end of the gate line 113. The second electrostatic discharge pattern 118 has a first width w1 (of FIG. 5) and extends to an outer portion of the first electrostatic discharge pattern 120. The first slit pattern 119 is connected to the second electrostatic discharge pattern 118. The first slit pattern 119 has a second width w2 (of FIG. 5) greater than the first width w1 and includes horizontal openings and horizontal bar patterns parallel to the gate line 113. In addition, the first electrostatic discharge pattern 120 has a fifth width w5 (of FIG. 6) greater than the first width w1 and is connected to the second electrostatic discharge pattern 118.

A gate insulating layer 123 is formed on the gate line 113, the gate electrode 115, the gate pad 121, the first electrostatic discharge pattern 120 and the second electrostatic discharge pattern 118. The gate insulating layer 123 is not formed on the first slit pattern 119, and the gate insulating layer 123 on the first electrostatic discharge pattern 120 may be thinner than the gate insulating layer 123 on the gate line 113, the gate electrode 115 and the gate pad 121. Alternatively, the gate insulating layer 123 may not be formed on the first electrostatic discharge pattern 120. The gate insulating layer 123 may be formed by depositing one of inorganic and organic insulating materials on the mother substrate 101 in a vacuum apparatus. While the insulating material is deposited, the edge portion of the mother substrate 101 corresponding to the first slit pattern 119 may be shielded by a shielding means such as a shadow mask or a shadow frame. As a result, the insulating layer 123 may not be formed on the first slit pattern 119. Further, since the first electrostatic discharge pattern 120 is close to the shielding means, the gate insulating layer 123 may be formed with a relatively thin thickness or may not be formed on the first electrostatic discharge pattern 120.

A semiconductor layer 125 including an active layer 125a of intrinsic amorphous silicon and an ohmic contact layer 125b of impurity-doped amorphous silicon is formed on the gate insulating layer 123 over the gate electrode 115.

Source and drain electrodes 133 and 136 are formed on the ohmic contact layer 125b, and a data line 130, a data pad 131 (of FIG. 4) and a third electrostatic discharge pattern 140 are formed on the gate insulating layer 123. The source electrode 133 is connected to the data line 130 and the drain electrode 136 is spaced apart from the source electrode 133. The data pad 131 is formed at one end of the data line 130 and the data line 130 crosses the gate line 113 to define a pixel region P. The third electrostatic discharge pattern 140 is connected to the other end of the data line 130. The third electrostatic discharge pattern 140 has a third width w3 (of FIG. 3) and extends to the outer portion of the first electrostatic discharge pattern 120. Further, a second slit pattern 142 connected to the third electrostatic discharge pattern 140 is formed on the first slit pattern 119 because the gate insulating layer 123 is not formed on the first slit pattern 119, and the first and second slit patterns 119 and 142 constitute a shortage pattern 145. The second slit pattern 142 has a fourth width w4 (of FIG. 5) greater than the third width w3 and includes vertical openings and vertical bar patterns parallel to the data line 130. As a result, the shortage pattern 145 includes a plurality of contact portions CP by contact of the first and second slit patterns 119 and 142.

In addition, the third electrostatic discharge pattern 140 crosses the first electrostatic discharge pattern 120. At the crossing portion, the first electrostatic discharge pattern 120 has a first slit part SL1 including first slant openings and first slant bar patterns and the third electrostatic discharge pattern 140 has a second slit part SL2 including second slant openings and second slant bar patterns. As a result, the first slit part SL1 of the electrostatic discharge pattern 120 and the second slit part SL2 of the third electrostatic discharge pattern 140 constitute a slant lattice shape having a plurality of overlapping portions OP.

In another embodiment, an additional semiconductor pattern including a first layer of intrinsic amorphous silicon and a second layer of impurity-doped amorphous silicon may be formed between the data line 130 and the gate insulating layer 123. The additional semiconductor pattern may have the same shape as the data line 130.

A passivation layer 150 is formed on the data line 130, the data pad 131, the source electrode 133, the drain electrode 136, the third electrostatic discharge pattern 140 and the second slit pattern. The passivation layer 150 includes a drain contact hole 153 exposing the drain electrode 136 and a data pad contact hole (not shown) exposing the data pad 131. Further, a gate pad contact hole (not shown) exposing the gate pad 121 is formed through the gate insulating layer 123 and the passivation layer 150.

A pixel electrode 160, a gate pad terminal (not shown) and a data pad terminal (not shown) of a transparent conductive material are formed on the passivation layer 150. The pixel electrode 160 in the pixel region P is connected to the drain electrode 136 through the drain contact hole 153. Although not shown in FIGS. 7 and 8, the pixel electrode 160 extends to and overlaps a previous gate line 113 to constitute a storage capacitor. The storage capacitor may include a portion of the gate line 113 as a first capacitor electrode, a portion of the pixel electrode 160 overlapping the first capacitor electrode as a second capacitor electrode and a portion of the gate insulating layer 123 and the passivation layer 160 between the first and second capacitor electrodes as a dielectric layer. In addition, the gate pad terminal is connected to the gate pad 121 through the gate pad contact hole, and the data pad terminal is connected to the data pad 131 through the data pad contact hole.

After the mother substrate 101 including the plurality of unit array patterns 110 is completed, the mother substrate 101 is attached to the other mother substrate (not shown) including a plurality of unit color filter patterns (not shown). Each of the plurality of unit color filter patterns includes a black matrix on the other mother substrate, a color filter layer including red, green and blue color filters and a common electrode on both the color filter layer and the black matrix, and the two mother substrates are attached such that the pixel electrode faces the common electrode. Next, the attached mother substrates are cut and divided along the substrate cutting line SCL into a plurality of attached unit substrates (not shown), and then liquid crystal materials are injected into each of the plurality of attached unit substrates to form a liquid crystal layer. Alternatively, the liquid crystal layer may be formed by a dispensing method before the mother substrate and the other mother substrates are attached, and then the attached mother substrates including the liquid crystal layer are cut and divided along the substrate cutting line SCL into a plurality of attached unit substrates (not shown).

Since the elements of the plurality of unit array patterns 110 such as the gate line 113, the data line 130 and the TFT Tr are electrically connected to each other through the first, second and third electrostatic discharge patterns 120, 118 and 140, the elements of the plurality of unit array patterns 110 have an equal voltage (an equipotential state). As a result, even when static electricity is generated during the fabrication process for the mother substrate 101, break of the elements of the plurality of unit array patterns 110 due to the voltage difference by the static electricity is prevented. In addition, since the static electricity generated at the inner portion of the first electrostatic discharge pattern 120 is transmitted to the outer portion of the first electrostatic discharge pattern 120 through the second and third electrostatic discharge patterns 118 and 140 and is discharged as a spark at the plurality of contact portions CP and the plurality of overlapping portions OP, break of the elements of the plurality of unit array patterns 110 due to the static electricity is prevented.

Consequently, a mother substrate for a liquid crystal display device according to an embodiment of the present invention includes a first electrostatic discharge pattern surrounding a central portion of the mother substrate, a second electrostatic discharge pattern connected to a plurality of gate lines of each unit array pattern, a third electrostatic discharge pattern connected to a plurality of data lines of each unit array pattern and a shortage pattern at ends of the second and third electrostatic discharge pattern. Further, the first electrostatic discharge pattern crosses the third electrostatic discharge pattern to constitute a plurality of overlapping portions. Accordingly, even when static electricity is generated at any portion of the mother substrate, the static electricity is transmitted through the first, second and third electrostatic discharge patterns and is discharged as a spark at the shortage pattern and the plurality of overlapping portions. In addition since deterioration of the plurality of unit array patterns of the mother substrate is prevented, the step of cutting the attached mother substrates is performed after the step of attaching the mother substrates and the step of injecting liquid crystal materials. Accordingly, the number of steps for attaching the mother substrates and injecting the liquid crystal molecules is minimized. As a result, productivity is improved and fabrication time is reduced.

It will be apparent to those skilled in the art that various modifications and variations can be made in a mother substrate for a liquid crystal display device and a method of fabricating the mother substrate of embodiments of the invention without departing from the spirit or scope of the invention. Thus, it is intended that embodiments of the invention cover the modifications and variations of this invention provided they come within the scope of the appended claims and their equivalents.

What is claimed is:

1. A mother substrate for a liquid crystal display device, comprising:
   a substrate;
   a plurality of unit array patterns on the substrate, each of the plurality of unit array patterns including a gate line, a data line crossing the gate line, a thin film transistor connected to the gate line and the data line and a pixel electrode connected to the thin film transistor;
   a first electrostatic discharge pattern surrounding the plurality of unit array patterns;
   a second electrostatic discharge pattern connected to the gate line and crossing the first electrostatic discharge pattern; and
   a third electrostatic discharge pattern connected to the data line and crossing the first electrostatic discharge pattern, the third electrostatic discharge pattern electrically connected to the second electrostatic discharge pattern.

2. The mother substrate according to claim 1, wherein the first electrostatic discharge pattern has a rectangular closed loop shape.

3. The mother substrate according to claim 1, wherein the first and second electrostatic discharge patterns have the same layer and the same material as the gate line.

4. The mother substrate according to claim 1, wherein the third electrostatic discharge pattern has the same layer and the same material as the data line.

5. The mother substrate according to claim 1, wherein the substrate includes a central portion and an edge portion surrounding the central portion, wherein the plurality of unit array patterns are disposed in the central portion and the first electrostatic discharge pattern is disposed at a boundary portion between the central portion and the edge portion, and wherein the second and third electrostatic discharge patterns extend from the central portion to the edge portion.

6. The mother substrate according to claim 5, further comprising a shortage pattern connecting the second and third electrostatic discharge patterns at the edge portion, wherein the shortage pattern comprises:
   a first slit pattern connected to the second electrostatic discharge pattern and having a width greater than the second electrostatic discharge pattern; and
   a second slit pattern connected to the third electrostatic discharge pattern and having a width greater than the third electrostatic discharge pattern, the second slit pattern contacting the first slit pattern.

7. The mother substrate according to claim 6, wherein the first slit pattern includes openings and bar patterns along a first direction and the second slit pattern includes openings and bar patterns along a second direction perpendicular to the first direction.

8. The mother substrate according to claim 6, further comprising a gate insulating layer between the gate line and the data line, wherein the first slit pattern has the same layer and the same material as the gate line and the second slit pattern has the same layer and the same material as the data line, and wherein the first and second slit patterns directly contact each other without the gate insulating layer interposed therebetween.

9. The mother substrate according to claim 1, wherein the first electrostatic discharge pattern has a first slit part at a crossing portion of the first and third electrostatic discharge patterns and the third electrostatic discharge pattern has a second slit part at the crossing portion of the first and third electrostatic discharge patterns, wherein the first slit part includes first slant openings and first slant bar patterns, wherein the second slit part includes second slant openings and second slant bar patterns, and wherein a slant direction of the first slant openings and the first slant bar patterns is opposite to a slant direction of the second slant openings and the second slant bar patterns.

10. A method of fabricating a mother substrate for a liquid crystal display device, comprising:
    forming a plurality of unit array patterns on a substrate, each of the plurality of unit array patterns including a gate line, a data line crossing the gate line, a thin film transistor connected to the gate line and the data line and a pixel electrode connected to the thin film transistor;
    forming a first electrostatic discharge pattern surrounding the plurality of unit array patterns;
    forming a second electrostatic discharge pattern connected to the gate line and crossing the first electrostatic discharge pattern; and
    forming a third electrostatic discharge pattern connected to the data line and crossing the first electrostatic discharge pattern, the third electrostatic discharge pattern electrically connected to the second electrostatic discharge pattern.

11. The method according to claim 10, wherein the substrate includes a central portion and an edge portions surrounding the central portion, wherein the plurality of unit array patterns are disposed in the central portion and the first electrostatic discharge pattern is disposed at a boundary portion between the central portion and the edge portion, and wherein the second and third electrostatic discharge patterns extend from the central portion to the edge portion.

12. The method according to claim 11, further comprising:
    forming a first slit pattern connected to the second electrostatic discharge pattern and having a width greater than the second electrostatic discharge pattern; and
    forming a second slit pattern connected to the third electrostatic discharge pattern and having a width greater than the third electrostatic discharge pattern, the second slit pattern contacting the first slit pattern, wherein the first and second slit patterns constitute a shortage pattern at the edge portion.

13. The method according to claim 12, further comprising forming a gate insulating layer on the gate line, the first electrostatic discharge pattern and the second electrostatic discharge pattern, wherein the first slit pattern is shielded from the gate insulating layer.

14. A method of fabricating a liquid crystal display device, comprising:

forming a plurality of unit array patterns on a first mother substrate, each of the plurality of unit array patterns including a gate line, a data line crossing the gate line, a thin film transistor connected to the gate line and the data line and a pixel electrode connected to the thin film transistor;

forming a first electrostatic discharge pattern surrounding the plurality of unit array patterns;

forming a second electrostatic discharge pattern connected to the gate line and crossing the first electrostatic discharge pattern;

forming a third electrostatic discharge pattern connected to the data line and crossing the first electrostatic discharge pattern, the third electrostatic discharge pattern electrically connected to the second electrostatic discharge pattern;

forming a plurality of unit color filter patterns on a second mother substrate, each of the plurality of unit color filter patterns including a black matrix, a color filter layer on the black matrix, a common electrode on the color filter layer;

attaching the first and second mother substrates such that the pixel electrode faces the common electrode;

cutting the first and second mother substrates along a substrate cutting line such that the first, second and third electrostatic discharge patterns are removed; and forming a liquid crystal layer between the pixel electrode and the common electrode.

* * * * *